US009869601B2

(12) United States Patent
Völkel

(10) Patent No.: US 9,869,601 B2
(45) Date of Patent: Jan. 16, 2018

(54) DEVICE FOR DETECTING THE MOTION OF A COMPACTOR ROLLER

(71) Applicant: Hamm AG, Tirschenreuth (DE)

(72) Inventor: Werner Völkel, Neustadt (DE)

(73) Assignee: Hamm AG, Tirschenreuth (DE)

( * ) Notice: Subject to any disclaimer, the term of this patent is extended or adjusted under 35 U.S.C. 154(b) by 0 days.

(21) Appl. No.: 15/265,243

(22) Filed: Sep. 14, 2016

(65) Prior Publication Data

US 2017/0102284 A1    Apr. 13, 2017

(30) Foreign Application Priority Data

Oct. 13, 2015    (DE) .......................... 10 2015 117 382

(51) Int. Cl.
*E01C 19/00* (2006.01)
*G01M 1/22* (2006.01)
*E01C 19/28* (2006.01)

(52) U.S. Cl.
CPC ............. *G01M 1/22* (2013.01); *E01C 19/286* (2013.01)

(58) Field of Classification Search
CPC ................................ G01M 1/22; E01C 19/286
USPC ........................ 404/75, 84.05–84.5, 113, 117
See application file for complete search history.

(56) References Cited

U.S. PATENT DOCUMENTS

| 3,778,177 A | 12/1973 | Haker et al. |
| 4,330,738 A * | 5/1982 | Paramythioti .......... E02D 3/074 318/128 |
| 5,390,495 A * | 2/1995 | Lemaire ................ E01C 19/286 404/117 |
| 2003/0108389 A1* | 6/2003 | Codina ..................... B06B 1/04 404/117 |

FOREIGN PATENT DOCUMENTS

| DE | 112010000670 | 12/2012 |
| DE | 102011088567 | 6/2013 |
| GB | 1602252 | 11/1981 |

OTHER PUBLICATIONS

German Search Report dated Jul. 14, 2016.

* cited by examiner

*Primary Examiner* — Raymond W Addie
(74) *Attorney, Agent, or Firm* — Rankin, Hill & Clark LLP

(57) ABSTRACT

A device for detecting the motion of a rotatable compactor roller about a compactor roller axis of rotation includes at least one motion sensor and an energy supply for the at least one motion sensor. The energy supply includes a generator having a stator and a rotor rotatable about a rotor axis of rotation with respect to the stator.

15 Claims, 4 Drawing Sheets

DEVICE FOR DETECTING THE MOTION OF A COMPACTOR ROLLER

BACKGROUND OF THE INVENTION

The present invention relates to a device for detecting the motion of a compactor roller rotatable about a compactor roller rotational axis, comprising at least one motion sensor and an energy supply for the at least one motion sensor.

A device of this sort is known from DE 10 2011 088 567 A1. This device comprises a plurality of motion sensors arranged in a roller mantle enclosed within the drum interior and designed as acceleration sensors. To supply the motion sensors with electrical energy, an energy transducer arrangement is arranged within the roller interior. The energy transducer arrangement generates energy from the motion of the compactor roller. For this purpose, the energy transducer arrangement has a vibrating mass, which is made to vibrate by the oscillatory or vibratory motion of the compactor roller, and causes a correspondingly periodic deformation in a piezoelectric element.

DE 11 2010 000 670 T5 discloses a device for detecting the motion of a compactor roller with a motion sensor and an associated energy supply. The energy supply comprises a linear reciprocating mass, which comprises either a permanent magnet surrounded by a non-moveable coil, or a permanent magnet stationary relative to a moveable coil. Through electromagnetic induction, the reciprocating motion of this mass provides the motion sensor with a supply of electrical energy.

SUMMARY OF THE INVENTION

It is the object of the present invention to provide a device for detecting the motion of a compactor roller, which, by taking advantage of motions occurring from the compaction activity within the area of a compactor roller, is suitable for providing a motion sensor with a reliable supply of electrical energy.

This object according to the invention is achieved by a device for detecting the motion of a compactor roller rotatable about a rotational axis, comprising at least one motion sensor and an energy supply for the at least one motion sensor.

It is therefore further provided that the energy supply comprises a generator with a stator and, relative to the stator, a rotor rotatable about a rotational axis.

The present invention makes use of the fact that, in carrying out the process of compaction, there occur within the area of a compactor generally rotating motions which are varied and generally very massive, thus driven by high-performance and high-torque propulsion drive systems. The coupling of the rotor of a generator with such rotating system sections does not impair their functionality, but rather ensures a reliable supply of electrical energy for the at least one motion sensor.

It can be provided according to a particularly advantageous aspect of the present invention that the rotor is capable of being rotated via an unbalance drive in an arrangement of unbalance masses in the compactor roller by turning about a rotational axis. In order to influence and/or improve the compaction effect, unbalance mass arrangements are employed in compactor rollers. These unbalance mass arrangements generally comprise one or more unbalance masses, which are driven in order to realize a rotational motion about the respective axes of rotation, and, depending on the positioning of the axis of rotation, lead to the generation of an oscillatory motion overlapping the rotary motion of the compactor roller, thus a periodic reciprocating motion of the compactor roller about its rotational axis, or lead to a vibratory motion, thus a periodic up and down motion of the compactor roller. Since the detection of the compactor roller motion in particular is thus of central importance, when the rotational motion of the compactor roller realized with the activity of compaction overlaps such oscillatory motion or vibratory motions, coupling the rotor to such an unbalance mass arrangement or an unbalance drive can ensure that, whenever information is being provided about the motion of the compactor roller during the operation of an unbalance mass arrangement, electrical energy is also available for the at least one motion sensor.

The unbalance mass arrangement may comprise at least one unbalance mass driven by the unbalance drive by turning about a unbalance axis of rotation. It can in particular be provided that the unbalance mass arrangement comprises at least one unbalance axis of rotation eccentric to the compactor roller axis of rotation for turning the driven unbalance shaft, that the unbalance drive comprises a rotatable unbalance drive shaft concentric to the compactor roller's rotational drive axis, an unbalance drive motor for the rotary drive of the unbalance drive shaft and the coupling arrangement for coupling with the at least one unbalance shaft for the transmission of torque, and that the rotor is coupled with the unbalance drive shaft, an unbalance shaft, or with the coupling arrangement for driving the rotation of the rotor.

In order to be able to transmit the torque from the unbalance drive motor in a simple and reliable manner from the unbalance drive shaft to the unbalance shaft, it is proposed that the coupling arrangement comprises a drive gear coupled with the unbalance drive shaft, an output gear coupled with an unbalance shaft, and a transmission member for the rotary coupling of the drive gear with the output gear, and that the rotor is coupled with the output gear or the transmission member for driving the rotation of the rotor.

Coupling the rotor with the unbalance drive can be made simple by arranging the rotational axis of the rotor concentric to the unbalance axis of rotation, and providing the output gear with an engaging structure, and, on the rotor, a complementary engaging structure for rotary coupling in position for or able to be mated with the engaging structure. It can be provided as an alternative that the rotor comprises a rotary drive connection that is in position for the transmission member or is able to be mated with it.

Regarding one design which simplifies construction as well as enabling the coupling of the rotor, it is proposed that the transmission member is an endless type of transmission, preferably a drive belt, V-belt or chain.

Particularly when the unbalance mass arrangement is being used for generating a vibratory motion in the compactor roller, thus a periodic up and down motion, it is proposed that the unbalance mass arrangement comprises at least one unbalance axis of rotation concentric to the rotational axis of the compactor roller for turning the driven unbalance shaft. In doing so, it can be advantageously provided that the rotational axis of the rotor is arranged concentric to the unbalance axis of rotation. This can be achieved, for example, by the rotor being coupled with the unbalance shaft and/or a motor shaft of an unbalance drive motor for driving the rotation of the rotor, and that the stator is provided with a mounting element for the compactor roller.

In order to provide information about the state of motion of a compactor roller in a reliable manner, it is proposed that at least one motion sensor is an acceleration sensor.

The present invention further relates to a compactor roller, comprising a compactor mantle enclosing a compactor roller interior, an imbalanced mass arrangement in the compactor roller interior, and an unbalance drive for driving at least one unbalance shaft about an unbalance axis of rotation, as well as a device according to the invention for detecting the motion of a compactor roller.

It can thereby be provided that the stator is supported by the compactor roller and movable about the axis of rotation of said compactor roller.

In order to provide easy and reliable coupling in such a compactor roller between the rotor and the unbalance drive, it is proposed that at least one unbalance shaft be driven by the turning of the unbalance drive about a compactor roller axis of rotation eccentric to the unbalance axis of rotation, that a removable closing element is provided in the radial region of the unbalance axis of rotation for enabling access to the compactor roller interior, and that the stator is supported on the closing element.

The invention further relates to a soil compactor with such a compactor roller.

The present invention is described hereinafter in reference to the enclosed drawings.

DETAILED DESCRIPTION OF THE DRAWINGS

Figure 1:
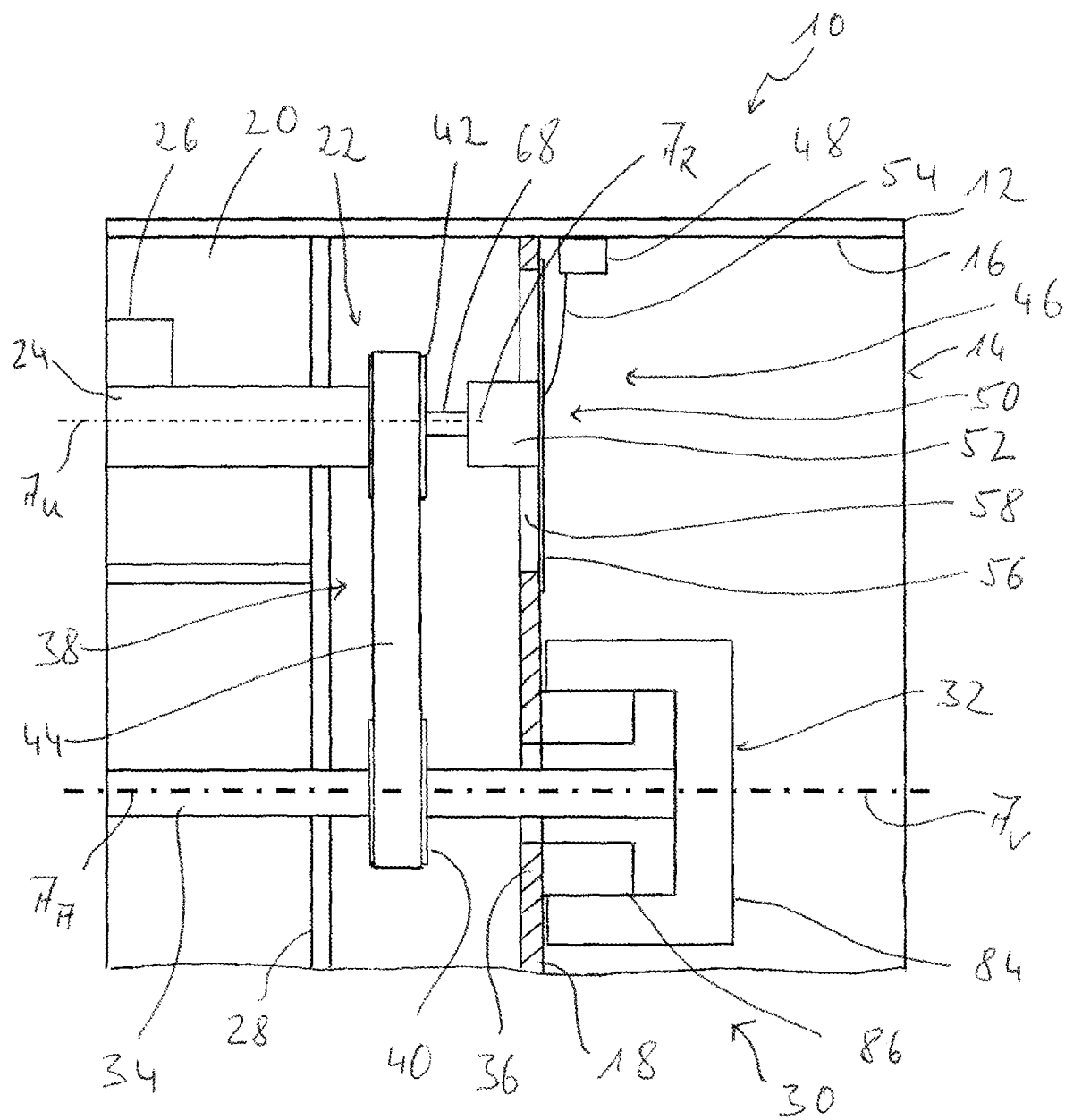
FIG. 1 a principle view of part of a compactor roller having an unbalance mass arrangement and an unbalance drive as well as a device for detecting the motion of the compactor roller.

FIG. 1 is a section view showing a compactor roller 10 rotatable during compaction activity about a compactor roller axis of rotation $A_V$. The compactor roller 10 comprises a compactor roller axis of rotation axis $A_V$ surrounded, ring-like, by a cylindrical mantle 12. Near one axial end area 14 of the roller mantle 12 or the compactor roller 10 is a disk-like support element 18 on one of the interior circumferential surfaces 16 of the roller mantle 12, commonly referred to as a circular blank, attached, for example, by welding. It should be noted that the other axial end area not shown in FIG. 1 can be designed in a way appropriate for attaching such a disk-like support element either there or in an intermediate area of the roller mantle 12.

Surrounded by the roller mantle 12 and arranged in the direction of the compactor roller axis of rotation $A_V$ via the support element 18 and bordering the compactor roller interior 20 is an arrangement generally identified as the unbalance mass arrangement 22. Shown in the FIG. 1 sectional view, the unbalance mass arrangement 22 serves only to generate an oscillatory motion overlaying the rotary motion of the compactor roller 10 about the compactor roller axis of rotation $A_V$, thus a periodic reciprocating rotary motion about the compactor roller axis of rotation $A_V$. For this purpose, the unbalance mass arrangement 22 comprises two unbalance shafts, which, with respect to the compactor roller axis of rotation $A_V$, are arranged opposite one other, only one of which is discernible in FIG. 1. On the unbalance shaft 24, or on each of the unbalance shafts of the unbalance mass arrangement 22, is one or more unbalance masses 26 provided with an eccentric center of mass with respect to a respective unbalance axis of rotation $A_U$. It should be noted that the unbalance mass 26 itself may be provided in the form of a suitably shaped unbalance shaft 24. The unbalance shaft 24 may be rotatably supported within the compactor roller interior 22 by the compactor mantle 12 or rather its interior circumferential surfaces 16 using one or more disk-like support elements 28.

The unbalance mass arrangement 22 further comprises an unbalance drive generally identified as 30. The unbalance drive 30 comprises an unbalance drive motor 32, for instance a hydraulic motor, which may be supported by an assembly not rotating with the compactor roller 10 about the compactor roller axis of rotation $A_V$, for example a structure resting on the soil compactor roller 10. An unbalance drive shaft 34 with an axis of drive rotation $A_A$ concentric to the compactor roller axis of rotation $A_V$ is driven by being turned by the unbalance drive motor 22. The unbalance drive shaft 34 may be rotatably supported within the compactor roller interior 20, for example using the support elements 28. It penetrates an opening 36 into the compactor roller interior 20 for the disk-like support element 18 on the axial border for coupling with the unbalance drive motor 32. It should be noted that the unbalance drive shaft 34 may be coupled with a motor shaft of the unbalance drive motor 32, or it may be provided via the motor shaft of the unbalance drive motor 32 itself.

In order to transmit the rotary motion or rather the torque from the unbalance drive shaft 34 concentric to the compactor roller axis of rotation $A_V$ to the unbalance shaft 24, the unbalance rotational axis $A_U$ which is eccentric to the compactor roller axis of rotation $A_V$ and therefore also to the unbalance drive axis of rotation $A_A$, a coupling arrangement is provided generally identified as 38. This comprises a drive gear 40 coupled, or non-rotatably attached, to the unbalance drive shaft 34, as well as an unbalance shaft 24 coupled, meaning non-rotatably attached, to the output gear 42. The drive gear 40 and the output gear 42 may be formed as gear wheels that are coupled to one other through a transmission member 44, in such case a toothed belt. It should here be noted that a gear wheel or a gear train might also be used as a transmission member. It should further be noted that an appropriate coupling with the unbalance drive shaft 34 can also be realized for the second unbalance shaft, which is not shown in FIG. 1.

In the compaction process, meaning when the compactor roller 10 is rotating about its compactor roller axis of rotation $A_V$, given the appropriate agitation by the unbalance drive motor 32, the rotational motion of the unbalance drive shaft 34 can be transmitted via the coupling arrangement 38 to the unbalance shaft 24, so that said unbalance shaft rotates about the unbalance axis of rotation $A_U$, and the unbalance mass 26 consequently also rotates about the unbalance axis of rotation $A_U$ The compactor roller 10 is, in addition, associated with a device generally identified as 46, using which its motion can be detected. In doing so, the motion of particular interest is that whereby the generally smoothly moving rotational motion of the compactor roller 10 about its compactor roller axis of rotation $A_V$ is overlapped, for example by the oscillatory reciprocating rotational motion generated by the unbalance arrangement 22. The device 46 comprises one or more motion sensors 48, for example attached to the interior circumferential surface 16 of the roller mantle 12, which is preferably designed as an acceleration sensor and can therefore, for example, detect acceleration in the circumferential direction occurring periodically and generated by the unbalance arrangement 22. In order to supply the motion sensors 48 with electrical energy, an energy supply is provided generally referred to as 50. This comprises a generator 52 that is connected via an electrical connection 54 to the motion sensor 48. The generator 50 is supported by a lid-like closing element 56 on the side facing the compactor roller interior 20. This lid-like closing element 56 serves to close up a maintenance opening 58 provided in the disk-like support element 18 within the radial region of the unbalance shaft 24. In order to gain access to the compactor roller interior 24, in particular to the region of the unbalance shaft 24, the closing element 56 can be detached from the disk-like support element 18.

Figure 2:
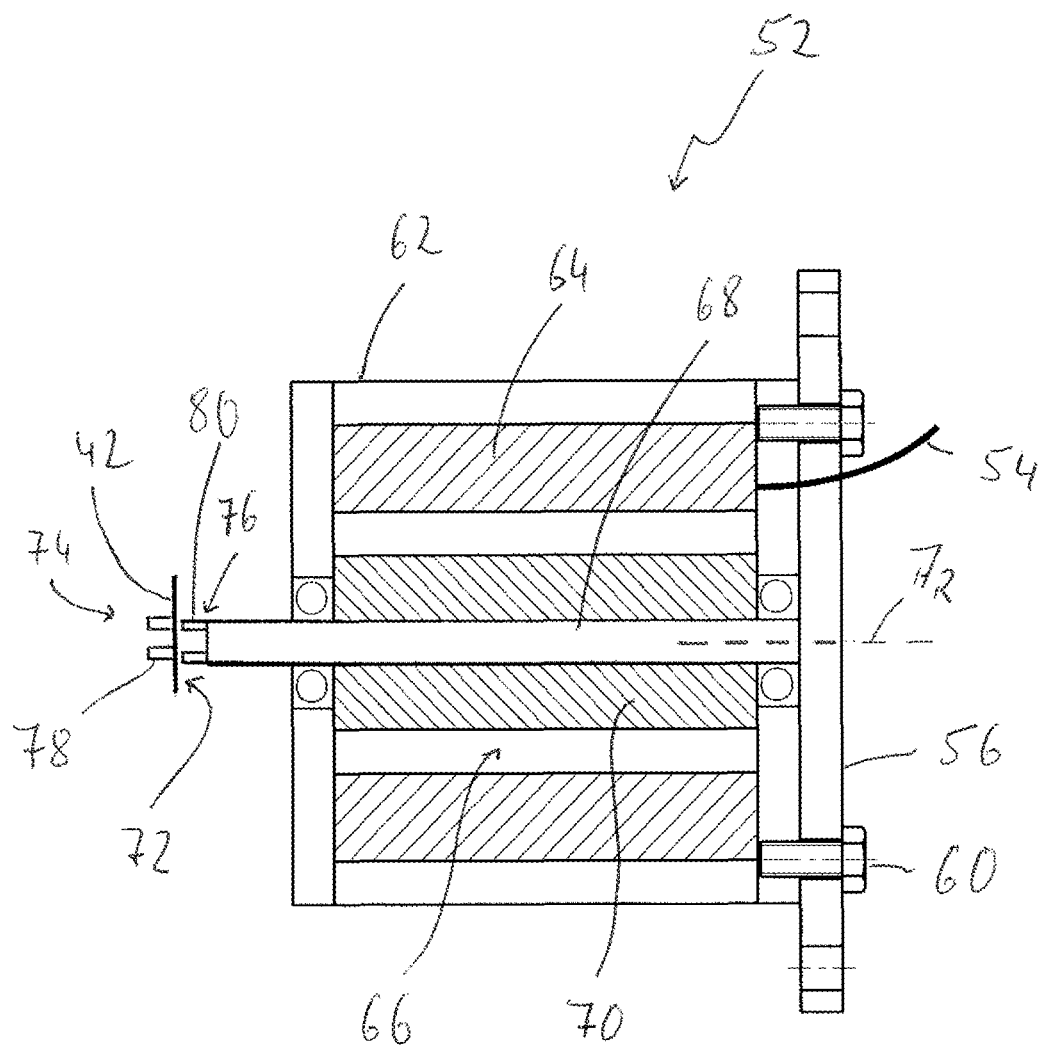
FIG. 2 a detail view of a generator for supplying a motion sensor with electrical energy.

The generator 52 is shown in greater detail in FIG. 2. It comprises a housing 62 fixed, for example, by one or more threaded bolts 60 to the closing element 56. On the interior of the housing 62 a stator, known generally as 64, is arranged, which may comprise one or more stator windings. The stator 64 is connected via the electrical connection 54 with the motion sensor 48. A rotor 66 of the generator 52 comprises a rotor shaft 68 rotatably mounted to the housing 62, preferably on both sides of the stator 64, said rotor shaft being rotatable about a rotor axis of rotation $A_R$. The rotor 66 may further comprise one or more permanent magnets 70 rigidly connected with the rotor shaft 68 for common rotation about the rotor axis of rotation $A_R$. Through electromagnetic interaction, the rotation of the rotor 66 about the rotor axis of rotation $A_R$ within the stator windings generates voltage, or a current flow.

FIG. 1 shows that the generator 52 is positioned on the closure element 56 in such a way that the rotor axis of rotation $A_R$ is concentric to the unbalance axis of rotation $A_U$ of the unbalance shaft 24. The rotor shaft 68 extends out to the output gear 24. On the front side 72 of the output gear 42 facing axial to the generator 52 and indicated in FIG. 2 there is provided an engaging structure generally identified as 74, which is in position for or able to be mated via a rotary coupling engagement with a complementary engaging structure 76 provided on the rotary shaft 68. As an example, the engaging structure 74 may comprise two or more engaging openings 78 positioned eccentric to the unbalance axis of rotation $A_U$, which can extend completely through the output gear 42 and can simultaneously be used also for the rotary coupling thereof to the unbalance shaft 24. The complementary engaging structure 76 may comprise the engaging openings 78 corresponding to two or more engaging projections 80 eccentric to the rotor rotational axis $A_R$, which can be positioned in engaging fashion into the engaging openings 78, thus guaranteeing the connection via the rotary coupling from the rotor shaft 68 to the output shaft and consequently the coupling arrangement 38.

During operation of the unbalance mass arrangement 22, meaning with the agitation of the unbalance drive motor 32 and the corresponding rotation of the unbalance shaft 24 about the unbalance axis $A_U$, the rotor shaft 68 is also driven to rotate so that, through electromagnetic induction, voltage, or a current flow, is generated in the generator 52, consequently feeding the motion sensor(s) 48. In this manner, it is ensured that, whenever a periodic motion of the compactor roller 10 to be detected is produced with respect to the frequency and amplitude of said compactor roller, in the present case an oscillatory motion, electrical energy can be provided for enabling the motion sensor 48 to transmit a signal representing this periodic motion to an evaluation unit not shown in the figures, for example via radio. Compared to the torque required for the unbalance drive motor 32 to move the unbalance shaft 24 or all the unbalance shafts, the torque required for operating the generator 52 is very small, so that coupling the generator 52 to the unbalance drive 30 does not affect the functionality of the unbalance mass arrangement 22.

It should be noted that, as long as the axial end of the unbalance shaft 24 facing the disc-like support element 18 for coupling the rotor shaft 68 is free, for example when the output gear 42 is set on the outer circumference of the unbalance shaft 24, the rotor shaft 68 of the generator 52 can also be connected directly to the unbalance shaft 24.

Figure 3:
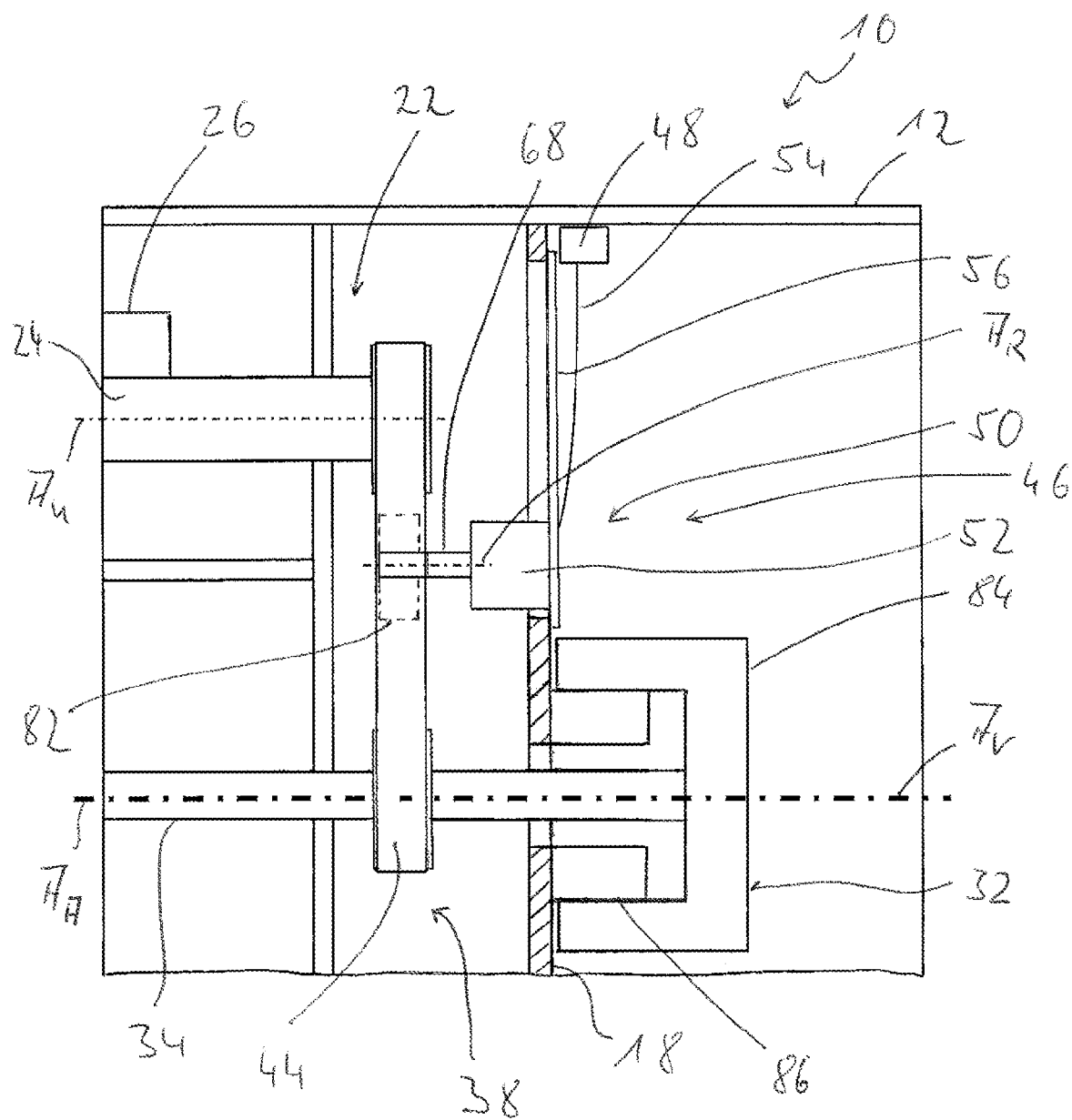
FIG. 3 a representation corresponding to FIG. 1, an alternative type of design.

An alternative way of coupling the generator 52 with the unbalance drive is shown in FIG. 3. In this type of design, the generator 52 is attached to the closing element 56 such that the rotor axis of rotation $A_R$ is positioned eccentric to the unbalance axis of rotation $A_U$ and also to the compactor roller axis of rotation $A_V$, more specifically positioned radially between these two axes of rotation. A rotor drive gear 82 is supported by the rotor shaft 68 as indicated in FIG. 3, said rotor drive gear positioned to engage with and in the vicinity of the transmission member 44 of endless transmission member design and linking in a meshing engagement via a linkage also provided on said transmission member 44. During operation of the unbalance mass arrangement 22 and by the corresponding motion of the transmission member 44, the rotor drive gear 82 and with it the rotor shaft 68 are consequently driven to rotate about the rotor axis of rotation $A_R$ so that the generator 52 can provide the electrical energy required for supplying the motion sensor 48.

Through coupling the generator 52 to the coupling arrangement 38 via the rotor drive gear 82, a transmission of rotational speed can be achieved such that, given appropriate construction and design, the rotor shaft 68 will be driven with the rotational speed necessary for rotation by the operation of the unbalance mass arrangement 22.

Figure 4:
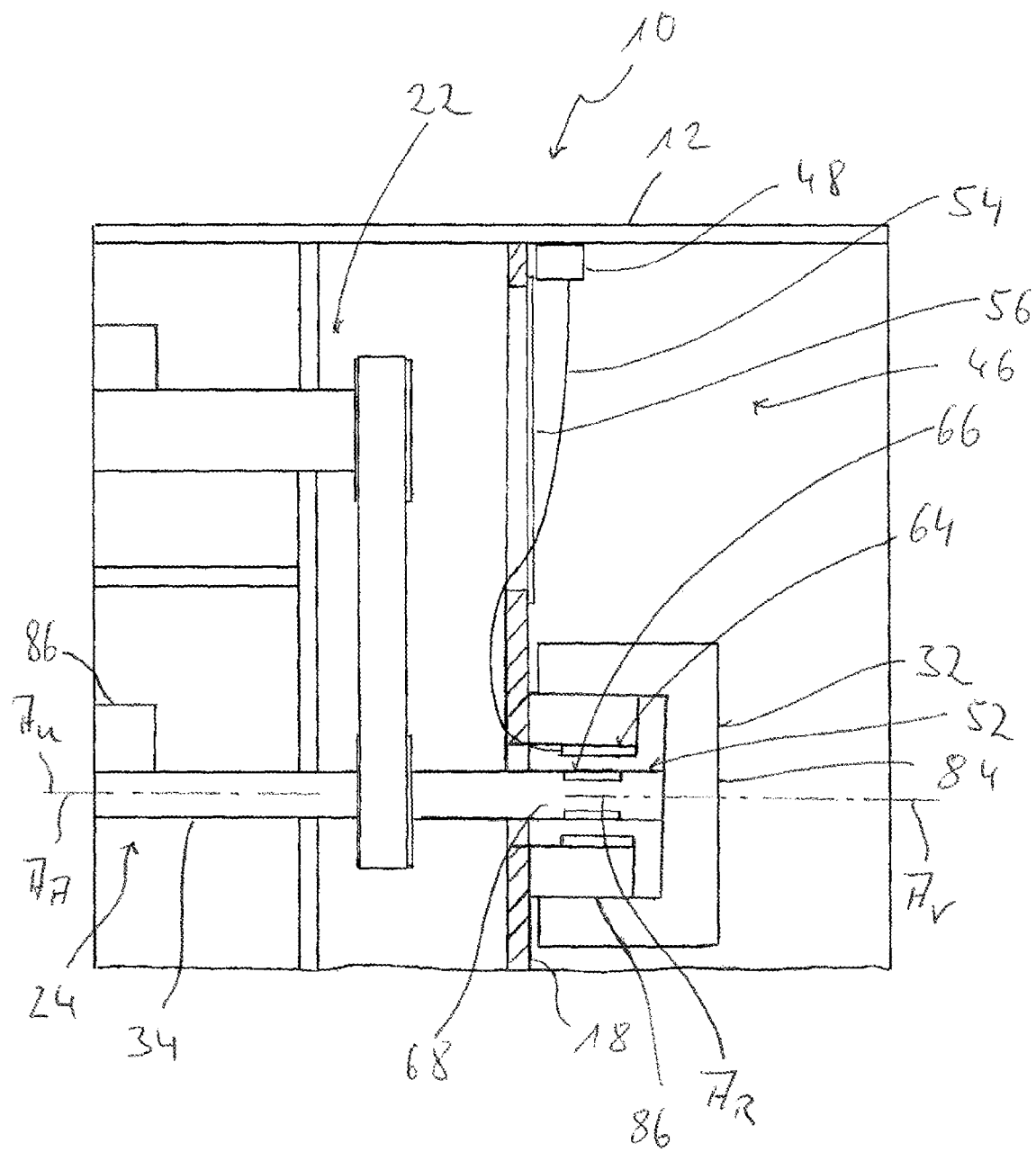
FIG. 4 a representation corresponding to FIG. 1, an alternative type of design.

A further alternative design type is shown in FIG. 4. It can be seen in the figure that the generator 52 is integrated in the area of the unbalance drive motor 32, or in the area where its rigid coupling is integrated with a machine frame or the like. The unbalance drive motor 32 comprises a motor housing 84, which may be attached to the machine frame via a support assembly (not shown) with elastic support elements. Provided on the support member 18 is a mounting base 86, which is mounted via the motor housing 84 and/or the support assembly and rotatable relative to the machine frame. The stator 64 of the generator 52 is provided with the support element 18 and thus with the non-rotatable mounting base 86 on the compactor roller 10. The rotor 66 is coupled, for example, with the unbalance drive shaft 34 for common rotation. In such a case, for example, the rotor shaft 68 may be provided via the unbalance drive shaft 34 or, given appropriate construction and design, via a motor shaft of the unbalance drive motor 32. Given this positioning of the generator 52, the rotor axis of rotation $A_R$, the drive axis of rotation $A_A$ and the compactor roller axis of rotation $A_V$ are concentric to one another.

One or more unbalance masses 86 may be arranged on the unbalance drive shaft 34 at the eccentric center of mass of the compactor roller axis of rotation $A_V$. Due to such unbalance masses 86 or from the unbalance generated by the rotation about the drive shaft axis of rotation $A_A$, a vibratory motion of the compactor roller 10 is generated, thus a periodic up and down motion. This allows the rotational motion of the compactor roller 10 about the compactor roller axis of rotation Av to be overlapped. In this case, the section of the system used to generate an oscillatory motion, specifically meaning the unbalance masses located eccentric to the compactor roller axis of rotation Av, may be dispensed with as long as the generation of such oscillatory motion by the compactor roller about the compactor roller axis of rotation Av is not necessary.

The positioning of the generator 52 shown in FIG. 4 in the area of the compactor roller axis of rotation Av is therefore particularly advantageous when, for example, the coupling arrangement shown in the diagrams is not present, meaning that essentially only the one unbalance shaft in the interior of the compactor roller 10 made available by the unbalance drive shaft 34 is present. Since this unbalance drive shaft 34 is already rotatably mounted with respect to the compactor roller 10, further rotary mountings in the area of the generator 52 are not necessary.

By means of the present invention, and without affecting the operation of a compactor roller, rotational motion is generated from the area of the compactor roller, more specifically from the rotational motion of a section of the system arranged in the compactor roller interior for generating a periodic reciprocating motion of the compactor roller, and, via a generator, used to provide electrical energy for operating one or more motion sensors. More specifically, said motion sensor(s) can therefore be supplied with electrical energy when a motion of the compactor roller, acceleration in specific, is expected for evaluation with respect to period and/or amplitude. The provision of electrical connections leading via a rotary throughfeed from the non-rotating sections of the system into the compactor roller is therefore not necessary. Nevertheless, by using a generator with a stator and a rotor rotatable about an axis of rotation with respect to said stator, an adequate and reliable supply of electrical energy can be ensured. As shown in the figures, this energy may be fed from the generator directly to the motion sensor(s), but may alternatively be directed to an energy storage device, e.g. a battery, so that the motion sensor(s) for providing the signals to be evaluated can be operated even if the unbalance mass assembly is not in operation. In addition, the electrical energy provided by the generator can be used in order to operate a radio transmitter unit (not shown in the figures), which may be coupled with one or more motion sensors and can have the purpose of sending the signal supplied by the motion sensors to an evaluation unit provided on the compactor. Alternatively, each of the motion sensors may be provided with its own associated transmitter unit powered by the generator 52.

The invention claimed is:

1. A device for detecting the motion of a rotatable compactor roller about a compactor roller axis of rotation comprising at least one motion sensor and an energy supply for the at least one motion sensor, wherein the energy supply comprises a generator having a stator and a rotor rotatable about a rotor axis of rotation with respect to the stator;
wherein the rotor is driven via a drive of an unbalance mass assembly in the compactor roller, by being rotated about the rotor axis of rotation.

2. The device according to claim 1, wherein the unbalance mass assembly comprises at least one driven unbalance mass being driven by the unbalance drive about an unbalance axis of rotation.

3. The device according to claim 2, wherein the unbalance mass assembly comprises at least one unbalance axis of rotation eccentric to the compactor roller axis of rotation for rotating a driven unbalance shaft, wherein the unbalance drive comprises an unbalance drive shaft rotatable about the compactor roller axis of rotation concentric to the drive axis of rotation, and further comprising an unbalance drive motor for the rotary drive of the unbalance drive shaft with the at least one unbalance shaft for transmission of torque to a coupling arrangement, and wherein the rotor is coupled with the unbalance drive shaft, the unbalance shaft, or the coupling arrangement for driving the rotation of the rotor.

4. The device according to claim 3, wherein the coupling arrangement comprises a drive gear coupled with the unbalance drive shaft, an output gear coupled with the unbalance shaft, and a transmission member for the rotary coupling of the drive gear with the output gear, and wherein the rotor is coupled with the output gear or the transmission member for driving the rotation of the rotor.

5. The device according to claim 4, wherein the rotor axis of rotation is arranged concentric to the unbalance axis of rotation, and that the output gear is provided with an engaging structure, and, on the rotor, a complementary engaging structure for rotary coupling in position for or able to be mated with the engaging structure.

6. The device according to claim 4, wherein the rotor comprises a rotor drive gear that is in position for the transmission member or is able to be mated with it via a rotary drive connection.

7. The device according to claim 4, wherein the transmission member is an endless transmission member, including a drive belt, V-belt or chain.

8. The device according to claim 2, wherein the unbalance mass assembly comprises at least one unbalance axis of rotation concentric to the compactor roller axis of rotation, about which the unbalance shaft is rotated.

9. The device according to claim 8, wherein the rotor axis of rotation is arranged concentric to the unbalance axis of rotation.

10. The device according to claim 9, wherein the rotor is coupled with the unbalance shaft and/or a motor shaft of an unbalance drive motor for the rotary drive of the rotor, and that the stator is provided with a mounting base on the compactor roller.

11. The device according to claim 1, wherein at least one motion sensor is an acceleration sensor.

12. A compactor roller, comprising a compactor mantle enclosing a compactor roller interior, an imbalance mass arrangement in the compactor roller interior, and an unbalance drive for driving at least one unbalance shaft about an unbalance axis of rotation, and a device for detecting the motion of the compactor roller according to claim 1.

13. A compactor roller according to claim 12, wherein the stator is supported by the compactor roller and movable about the axis of rotation of said compactor roller.

14. A compactor roller according to claim 12 wherein the at least one unbalance shaft is driven by the turning of the unbalance drive about the compactor roller axis of rotation eccentric to the unbalance axis of rotation, that a removable closing element is provided in the radial region of the unbalance axis of rotation for enabling access to the compactor roller interior, and that the stator is supported on the closing element.

15. A soil compactor, comprising a compactor roller according to claim 12.

* * * * *